US009215134B2

(12) United States Patent
Li et al.

(10) Patent No.: US 9,215,134 B2
(45) Date of Patent: Dec. 15, 2015

(54) METHOD AND LABEL FORWARDING ROUTER FOR INITIATING LDP SESSION CONNECTION

(71) Applicant: HUAWEI TECHNOLOGIES CO., LTD., Shenzhen (CN)

(72) Inventors: Hongliang Li, Shenzhen (CN); Ling Jiang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 127 days.

(21) Appl. No.: 14/058,747

(22) Filed: Oct. 21, 2013

(65) Prior Publication Data

US 2014/0043958 A1 Feb. 13, 2014

Related U.S. Application Data

(63) Continuation of application No. PCT/CN2011/073183, filed on Apr. 22, 2011.

(51) Int. Cl.
*H04L 12/24* (2006.01)
*H04L 12/723* (2013.01)

(52) U.S. Cl.
CPC .......... *H04L 41/0654* (2013.01); *H04L 45/507* (2013.01)

(58) Field of Classification Search
CPC .......................... H04L 41/0654; H04L 45/507
See application file for complete search history.

(56) References Cited

U.S. PATENT DOCUMENTS

| 7,310,356 | B2 | 12/2007 | Abdo et al. | |
|---|---|---|---|---|
| 7,408,882 | B2 | 8/2008 | Abdo et al. | |
| 7,463,591 | B1 * | 12/2008 | Kompella et al. | 370/248 |
| 7,500,015 | B2 | 3/2009 | Hiyama et al. | |
| 7,769,885 | B1 * | 8/2010 | Kompella | 709/238 |
| 2003/0026271 | A1 | 2/2003 | Erb et al. | |
| 2003/0088697 | A1 * | 5/2003 | Matsuhira | 709/238 |

(Continued)

FOREIGN PATENT DOCUMENTS

| CN | 1852212 | 10/2006 |
|---|---|---|
| CN | 1871813 | 11/2006 |

(Continued)

OTHER PUBLICATIONS

International Search Report and Written Opinion of the International Searching Authority issued Feb. 2, 2012 in corresponding International Patent Application No. PCT/CN2011/073183.
Asati et al. "Updates to LDP for IPv6" MPLS Working Group. Apr. 5, 2010.
Chinese Office Action dated Aug. 4, 2014 in corresponding Chinese Patent Application No. 201180000322.0.

(Continued)

*Primary Examiner* — Brian D Nguyen
(74) *Attorney, Agent, or Firm* — Staas & Halsey LLP

(57) ABSTRACT

Embodiments of the present invention provide a method and a label forwarding router for initiating an LDP session connection. The method includes: using an address of a first transport address family of a local device as a connection address, and starting an LDP session setup procedure for the local device and a peer device according to the address; setting a random time value in the procedure; determining that current time reaches the random time value and that the LDP session setup fails; and selecting an address of a second transport address family as a new connection address, and starting a new LDP session setup procedure according to the new address. The present invention can implement normal initiation of an LDP session connection.

11 Claims, 5 Drawing Sheets

(56) References Cited

U.S. PATENT DOCUMENTS

| | | | |
|---|---|---|---|
| 2006/0193248 A1* | 8/2006 | Filsfils et al. | 370/216 |
| 2008/0198751 A1* | 8/2008 | Li | 370/238 |
| 2009/0168779 A1* | 7/2009 | Nguyen | 370/392 |
| 2009/0207821 A1 | 8/2009 | Rune | |
| 2009/0245149 A1* | 10/2009 | Xia et al. | 370/310 |
| 2010/0177774 A1 | 7/2010 | Hart et al. | |
| 2012/0176930 A1* | 7/2012 | So et al. | 370/254 |

FOREIGN PATENT DOCUMENTS

| | | |
|---|---|---|
| CN | 101473632 | 7/2009 |
| EP | 1 722 523 A1 | 11/2006 |

OTHER PUBLICATIONS

International Search Report mailed Apr. 22, 2011 in corresponding International Application No. PCT/CN2011/073183.

Durand, Alain, James Paugh, and Sebastien Roy. *Issues with Dual Stack IPv6 on by Default.* Internet-Draft Memo: The Internet Society, Jul. 2004.

Andersson, Loa, Ina Minei, and Bob Thomas. *LDP Specification.* Internet-Draft Memo: The Internet Engineering Task Force, Oct. 2007.

Asati, Rajiv, Vishwas Manral, Rajiv Papneja, and Carlos Pignataro. *Updates to LDP for IPv6.* Internet-Draft Memo: The Internet Engineering Task Force, Mar. 28, 2011.

Extended European Search Report issued Jan. 9, 2014, in corresponding European Patent Application No. 11863748.7.

* cited by examiner

METHOD AND LABEL FORWARDING ROUTER FOR INITIATING LDP SESSION CONNECTION

CROSS-REFERENCE TO RELATED APPLICATIONS

This application is a continuation of International Application No. PCT/CN2011/073183, filed on Apr. 22, 2011, which is hereby incorporated by reference in its entireties.

TECHNICAL FIELD

Embodiments of the present invention relate to communication technologies, and in particular, to a method and a label forwarding router for initiating an LDP session connection.

BACKGROUND

In a multi protocol label switching (Multi Protocol Label Switching, MPLS) network, a label distribution protocol (Label Distribution Protocol, LDP) session needs to be set up between different label forwarding routers (Label Switched Router, LSR) to exchange messages such as a label mapping message and a release message, so as to set up a label switching path (Label Switching Path, LSP) is between different LSRs. A TCP connection is set up between two LSRs to transmit LDP messages.

In network applications of the prior art, the next-generation Internet Protocol (Internet Protocol version 6, IPv6), thanks to its larger address space and other advantages, is gradually replacing the conventional IPV4 protocol; however, IPV6 still needs continuous development and improvement, and will coexist with IPv4 for a long time in actual applications, namely, a dual-stack network. In a dual-stack network scenario, when a TCP connection is set up to implement an LDP session, one LSR has an IPV4 address family and an IPV6 address family, and can use the IPV4 address family or the IPV6 address family to set up the TCP connection. In this case, it is possible that the address families selected by two LSRs are inconsistent. For example, when one LSR selects the IPV4 address family to request to set up a TCP connection, but the other corresponding LSR selects the IPV6 address family to set up a TCP connection, the two address families are inconsistent, which inevitably results in an LDP session setup failure.

However, a policy used in the existing dual-stack network scenario does not allow switching between address families, that is, an LSR always attempts to set up a TCP connection by using an address family selected by the LSR without any change, which causes a deadlock of an LDP session, that is, an LDP session connection may fail to be initiated normally due to inconsistency of address families.

SUMMARY

Embodiments of the present invention provide a method and a label forwarding router for initiating an LDP session connection, so that an LDP session connection can be initiated normally.

An embodiment of the present invention provides a method for initiating a Label Distribution Protocol (LDP) session connection, including:

using an address of a local device that belongs to a first transport address family as a connection address of the local device, and starting an LDP session setup procedure for the local device and a peer device according to the connection address of the local device;

setting a random time value and performing timing in the LDP session setup procedure;

determining that current time reaches the random time value and that the LDP session setup fails; and selecting an address of the local device that belongs to a second transport address family as a new connection address of the local device, and starting a new LDP session setup procedure for the local device and the peer device according to the new connection address of the local device.

An embodiment of the present invention provides a label forwarding router, including:

a connecting unit, configured to use an address of the label forwarding router that belongs to a first transport address family as a connection address of the router, and start an LDP session setup procedure for the label forwarding router and a peer device according to the connection address of the router;

a timing unit, configured to set a random time value and perform timing in the LDP session setup procedure;

an address switching unit, configured to select an address of the label forwarding router that belongs to a second transport address family as a new connection address of the router when the timing unit determines that current time reaches the random time value and a connection result of the connecting unit is that the LDP session setup fails; and a session reestablishing unit, configured to instruct the connecting unit to start a new LDP session setup procedure for the label forwarding router and the peer device according to the new connection address of the router.

The method and the label forwarding router for initiating an LDP session connection according to the embodiments of the present invention, by setting a random time value to control automatic switching between address families, solve the deadlock problem of an LDP session setup procedure, and implement normal initiation of an LDP session connection in a dual-stack network.

BRIEF DESCRIPTION OF DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Embodiment 1

Figure 1:
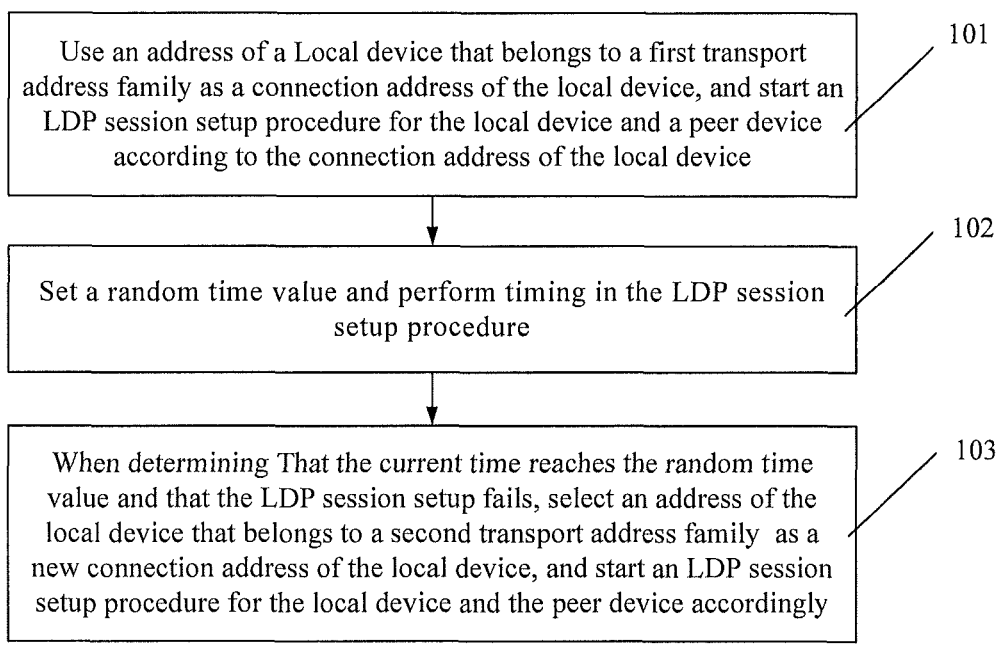
FIG. 1 is a schematic flowchart of Embodiment 1 of a method for initiating an LDP session connection according to the present invention.

FIG. 1 is a schematic flowchart of Embodiment 1 of a method for initiating an LDP session connection according to the present invention. As shown in FIG. 1, the method may include the following steps:

Step 101: Use an address of a local device that belongs to a first transport address family as a connection address of the local device, and start an LDP session setup procedure for the local device and a peer device according to the connection address of the local device.

For example, the local device may be a dual-stack protocol router having two types of addresses, namely, an IPV4 address and an IPV6 address, and may select an address of a first transport address family, such as the IPV4 address family, to start a session setup procedure; and the peer device may also be a router. For example, the local device may act as an initiator to send an LDP session setup request to the peer device, or act as a responder to start receiving an LDP session setup request sent by the peer device.

Preferably, the starting an LDP session setup procedure for the local device and the peer device according to the connection address of the local device includes: determining, by the local device, itself as an initiator; and sending, by the local device, an LDP session setup request to the peer device, so that an LDP session connection may be set up with the peer device.

Preferably, the starting an LDP session setup procedure for the local device and the peer device according to the connection address of the local device includes: determining, by the local device, itself as a responder; and starting, by the local device, receiving an LDP session setup request sent by the peer device, so that the two parties may set up an LDP session connection after the LDP session setup request sent by the peer device is received by the local device.

Preferably, the local device receives a neighbor discovery message sent by the peer device, where the neighbor discovery message includes a target address of the peer device that belongs to the first transport address family, so that the local device may determine that it needs to use an address of the local device that belongs to the first transport address family to set up an LDP session connection.

The local device may determine itself as the initiator or responder of the LDP session setup procedure by using multiple methods.

Optionally, the local device may be configured as an initiator or a responder by setting configuration information, and further, the peer device may be configured as a responder or an initiator correspondingly.

Optionally, the local device may further compare the connection address of the local device with the target address of the peer device; and if the address of the local device is greater, the local device acts as the initiator of the LDP session setup procedure; or if the address of the local device is smaller, the local device acts as the responder of the LDP session setup procedure.

Step 102: Set a random time value and perform timing in the LDP session setup procedure.

In this embodiment, a random time value may be set by starting a random value timer. The random value timer may generate a random timing duration, that is, its timing duration is not a fixed value.

In this embodiment, by setting a random time value, automatic switching between address families may be implemented according to the LDP session setup progress, and a deadlock of the LDP session setup process is avoided; furthermore, the probability that a deadlock occurs when the peer device also adopts timed rotational switching may be reduced effectively.

Preferably, if the local device is an initiator, a random time value is set after the local device receives a connection failure response returned by the peer device.

Preferably, if the local device is a responder, a random time value is set when or after the local device starts receiving an LDP session setup request sent by the peer device.

Step 103: When determining that the current time reaches the random time value and that the LDP session setup fails, select an address of the local device that belongs to a second transport address family as a new connection address of the local device, and start an LDP session setup procedure for the local device and the peer device according to the new connection address of the local device.

For example, when the local device determines that the current time reaches the random time value and that the LDP session setup fails, the first transport address family initially selected by the local device is switched to the second transport address family, that is, an address that belongs to an IPV6 address family, namely, an IPV6 address, is used as a new connection address of the local device; and then the local device returns to step 101 to restart an LDP session setup procedure with the peer device by using the IPV6 address.

Steps 101 to 103 above may be repeated, that is, when the LDP session setup of one address family fails, the address family may be switched, and another address family is used to reattempt to set up an LDP session. After the LDP session setup is successful, the running random value timer is stopped, that is, switching between address families is stopped, and the local device starts an LDP session by using the selected address family.

Preferably, the first transport address family is an IPv4 address family, and the second transport address family is an IPv6 address family; or the first transport address family is an IPv6 address family, and the second transport address family is an IPv4 address family.

The method for initiating an LDP session connection according to the embodiment, by setting a random time value to control automatic switching between address families, solves the deadlock problem of an LDP session setup procedure, and implements normal initiation of an LDP session connection in a dual-stack network.

Embodiment 2

Figure 2:
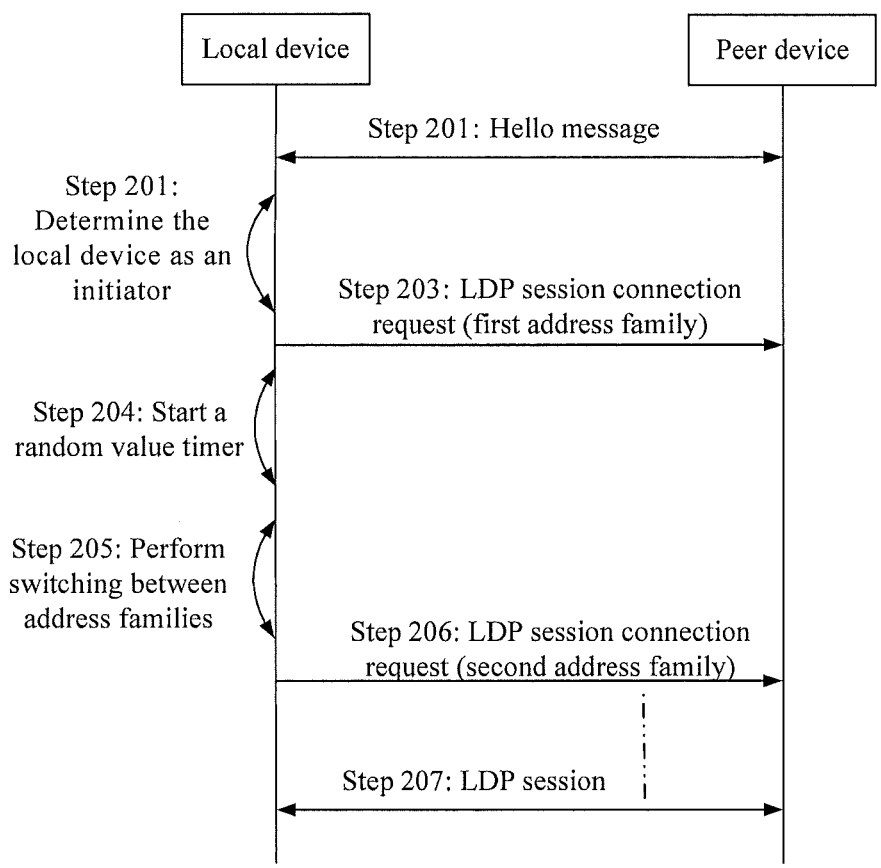
FIG. 2 is a schematic signaling flowchart of Embodiment 2 of a method for initiating an LDP session connection according to the present invention.

FIG. 2 is a schematic signaling flowchart of Embodiment 2 of a method for initiating an LDP session connection according to the present invention. As shown in FIG. 2, in the method of this embodiment, exemplarily, an LDP session connection is initiated in a dual-stack network, and the manner of setting a random time value is using a random value timer. The method may include the following steps:

Step 201: A local device and a peer device send an IPV4/IPV6 LDP Hello message to each other.

In this embodiment, both the local device and the peer device may be label forwarding routers (LSR), and the local device is a dual-stack device. The local device may send an LDP Hello message by using an IPV4 address family, or send an LDP Hello message by using an IPV6 address family, to discover a neighbor that may set up an LDP session.

Step 202: The local device receives the LDP Hello message sent by the peer device, determines an address required for setting up a session connection, and determines the local device as an initiator.

Because LDP Hello messages are sent and received based on a UDP protocol, and an LDP neighbor is discovered dynamically, the local device may receive LDP Hello messages of different address families of the peer device. For example, the local device may first receive the LDP Hello message sent by the peer device by using the IPV4 address family, or may first receive the LDP Hello message sent by the peer device by using the IPV6 address family.

For example, the LDP Hello message first received by the local device from the peer device carries a target address of the peer device, where the target address belongs to a first transport address family; and therefore the local device also selects an address of the local device that belongs to the first transport address family as a connection address of the local device, and performs a related LDP session setup procedure with the peer device by using this address. After selecting the address family, the local device keeps using the selected address family at a time to perform an LDP session setup procedure. For example, the address family carried in the LDP Hello message first received by the local device is an IPV4 address, and correspondingly, the local device may select its own IPV4 address as a connection address of the local device for starting the session setup procedure.

After selecting the address family, the local device may further compare the connection address of the local device with the target address of the peer device; and if the address of the local device is greater, the local device acts as the initiator of the LDP session setup procedure; or if the address of the local device is smaller, the local device acts as the responder of the LDP session setup procedure.

In this embodiment, exemplarily, the local device is an initiator.

Step 203: The local device sends an LDP session setup request to the peer device by using the connection address of the local device that belongs to the first transport address family.

For example, in this embodiment, the manner of requesting to set up an LDP session with the peer device may be requesting to set up a TCP connection. The LDP session setup may be successful or fail. For example, the peer device may also select an address of an address family same as that carried in the LDP Hello message first received by the peer device as an address for starting the session setup procedure.

In this case, it is possible that the address families selected by the peer device and local device are the same or different. Specifically, if the initially selected address families are the same, for example, both the local device and peer device select an IPV4 address family to perform an LDP session setup procedure, the LDP session setup may be successful, and step 207 may continue to be executed; if the initially selected address families are different, for example, the local device selects IPV4, while the peer LSR selects IPV6, the LDP session setup fails, and step 204 needs to be executed.

Specifically, after sending a session setup request to the peer device, the local device may determine that the setup result of the session setup procedure is a session setup failure when receiving a connection failure response returned by the peer device.

Step 204: Start a random value timer.

That is, when the local device acting as an initiator fails to initiate an LDP session setup request, the random value timer may be started. The timing setting of the random value timer is mainly to provide a buffering function for switching between address families, and its duration is short, for example, 2 seconds.

In addition, as an optional solution, step 204 may also be omitted and step 205 is directly executed, that is, when the local device acting as an initiator fails to initiate an LDP session setup request, the random value timer may not be started, but switching between address families is directly performed.

Step 205: The local device performs switching between address families.

When determining that the random value timer reaches the random timing duration, the local device performs switching between address families, and switches the initially selected address that belongs to the first transport address family to an address that belongs to a second transport address family. For example, the address family initially selected by the local device is an IPV4 address family; and after an LDP session fails to be set up by using the address family, an IPV6 address family may be selected.

Step 206: The local device restarts the LDP session setup procedure by using the second transport address family.

For example, the local device receives not only the IPV4 LDP Hello message sent by the peer device, but also the IPV6 LDP Hello message sent by the peer device; because the first received message is the IPV4 LDP Hello message, the IPV4 address family is selected as the first transport address family to perform the LDP session setup procedure.

After performing switching between address families in step 205, the local device starts using the IPV6 address family, namely, the second transport address family, to start the LDP session setup procedure; in this case, the local device also needs to know, according to the comparison with the IPV6 address family of the peer device in the previously received hello message, whether the local device acts as an initiator or a responder of the LDP session connection. If the local device acts as the initiator, the local device executes the operation in step 203, and starts initiating an LDP session setup request to the peer device by using the IPV6 address family, that is, starts repeating step 203 and the subsequent procedure until the LDP session setup is successful, and continues to execute step 207; or if the local device acts as the responder, the local device may proceed according to the method described in Embodiment 3.

Step 207: Transport an LDP session message through the established LDP session.

In this step, after the LDP session setup between the local device and the peer device is successful, the LDP session between the two devices may start; and in this case, the running random value timer may be stopped, that is, switching between address families is stopped.

In this embodiment, by setting a random value timer, automatic switching may be performed between address families according to the LDP session setup progress, and a deadlock of an LDP session setup process is avoided; in addition, if the peer device also uses the manner of starting a timer for switching between address families, because this embodiment uses a random value timer, the probability that random timing duration values of the two devices are always the same is small, the probability of consistency of address families of the two devices is increased, and the probability that a deadlock occurs when the peer device also adopts timed switching is effectively reduced.

The method for initiating an LDP session connection according to the embodiment, by setting a random value timer to control automatic switching between address families, solves the deadlock problem of an LDP session setup procedure, and implements normal setup of an LDP session in a dual-stack network.

Embodiment 3

Figure 3:
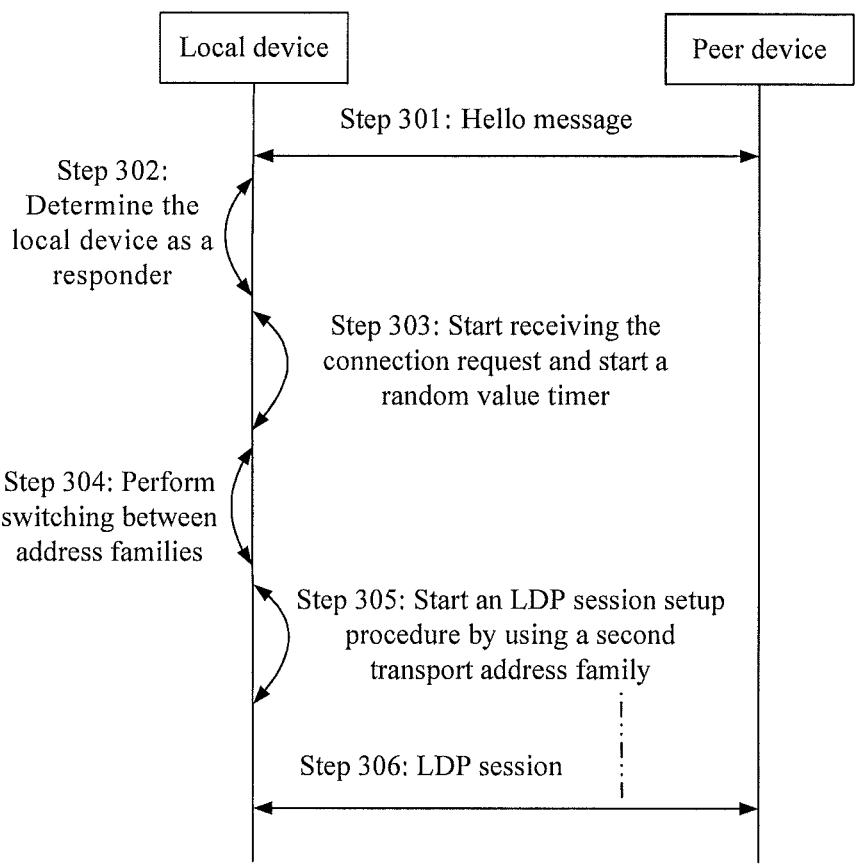
FIG. 3 is a schematic signaling flowchart of Embodiment 3 of a method for initiating an LDP session connection according to the present invention.

FIG. 3 is a schematic signaling flowchart of Embodiment 3 of a method for initiating an LDP session connection according to the present invention. As shown in FIG. 3, in the method of this embodiment, exemplarily, an LDP session connection is initiated in a dual-stack network, and the manner of setting a random time value is using a random value timer. The method may include the following steps:

Step 301: A local device and a peer device send an IPV4/IPV6 LDP Hello message to each other.

In this embodiment, both the local device and the peer device may be label forwarding routers (LSR), and the local device is a dual-stack router. The local device may send an LDP Hello message by using an IPV4 address family, or send an LDP Hello message by using an IPV6 address family, to discover a neighbor that may set up an LDP session.

Step 302: The local device receives the LDP Hello message sent by the peer device, determines an address required for setting up a session connection, and determines the local device as a responder.

Because LDP Hello messages are sent and received based on a UDP protocol, and an LDP neighbor is discovered dynamically, the sequence of receiving, by the local device, LDP Hello messages of different address families of the peer device is also not determined. For example, the local device may first receive the LDP Hello message sent by the peer device by using the IPV4 address family, or may first receive the LDP Hello message sent by the peer device by using the IPV6 address family.

For example, the LDP Hello message first received by the local device from the peer device carries a target address of the peer device, where the target address belongs to a first transport address family; and therefore the local device also selects an address of the local device that belongs to the first transport address family as a connection address of the local device, and starts performing a related LDP session setup procedure with the peer device by using this address family. After selecting the address family, the local device keeps using the selected address family at a time to perform an LDP session setup procedure. For example, the address family carried in the LDP Hello message first received by the local device is an IPV6 address, and correspondingly, the local device may select its own IPV6 address family as a connection address of the local device for starting the session setup procedure.

After selecting the address family, the local device may further compare the connection address of the local device with the target address of the peer device; and if the address of the local device is greater, the local device acts as the initiator of the LDP session setup procedure; or if the address of the local device is smaller, the local device acts as the responder of the LDP session setup procedure.

In this embodiment, exemplarily, the local device is a responder.

Step 303: The local device starts receiving an LDP session setup request sent by the peer device, and starts a random value timer.

For example, in this embodiment, the manner of requesting to set up an LDP session with the peer device may be requesting to set up a TCP connection. When the local LSR determines, according to the connection address of the local device and the target address of the peer device, that the local device is a responder in step 302, the local LSR starts a session setup procedure, for example, starts receiving the LDP session setup request sent by the peer device; and may start the random value timer when or after starting receiving the LDP session setup request sent by the peer device.

The timing duration of the random value timer in this step may be longer, for example, 20 seconds to 25 seconds. In this step, the LDP session setup may be successful or fail. For example, the peer device also selects an address of an address family same as that carried in the LDP Hello message first received by the peer device to start the session setup procedure.

In this case, it is possible that the address families selected by the peer device and local device are the same or different. Specifically, if the initially selected address families are the same, for example, both the local device and peer device select an IPV4 address family to perform an LDP session setup procedure, the LDP session setup may be successful, and step 306 may continue to be executed; if the initially selected address families are different, for example, the local device selects IPV6, while the peer device selects IPV4, the LDP session setup fails, and step 304 needs to be executed.

Step 304: The local device performs switching between address families.

If the local device still does not receive a connection request from the peer device after the random value timing duration in step 303, it indicates that the LDP session setup is not successful, that is, the setup result of the session setup procedure is a session setup failure; in this case, the local device switches the first transport address family to a second transport address family. For example, the address family initially selected by the local device is an IPV6 address family; after an LDP session fails to be set up by using the address family, switching between address families may be performed and an IPV4 address family may be selected.

Step 305: The local device starts the LDP session setup procedure by using the second transport address family.

For example, the local device receives not only the IPV4 LDP Hello message sent by the peer device, but also the IPV6 LDP Hello message sent by the peer device; because the first received message is the IPV6 LDP Hello message, the IPV6 address family is selected as the first transport address family to perform the LDP session setup procedure.

After performing switching between address families in step 304, the local device starts using the IPV4 address family, namely, the second transport address family, to start the LDP session setup procedure; in this case, the local device also needs to know, according to the comparison with the IPV4 address family of the peer device, whether the local device acts as an initiator or a responder of the LDP session setup. If the local device acts as the responder, the local device executes the operation in step 303, and starts receiving an LDP session setup request sent by the peer device, that is, starts repeating step 303 and the subsequent procedure until the LDP session setup is successful, and continues to execute step 306; or if the local device acts as the initiator, the local device may proceed according to the method described in Embodiment 2.

Step 306: Transport an LDP session message through the established LDP session.

In this step, after the LDP session setup between the local device and the peer device is successful, the LDP session between the two devices may start; and in this case, the running random value timer may be stopped, that is, switching between address families is stopped.

In this embodiment, by setting a random value timer, automatic switching may be performed between address families according to the LDP session setup progress, and a deadlock of an LDP session setup process is avoided; in addition, if the peer device also uses the manner of starting a timer for switching between address families, because this embodiment uses a random value timer, the probability that random timing duration values of the two devices are always the same is small, the probability of consistency of address families of the two devices is increased, and the probability that a deadlock occurs when the peer device also adopts timed switching is effectively reduced.

The method for initiating an LDP session connection according to the embodiment, by setting a random value timer to control automatic switching between address families, solves the deadlock problem of an LDP session setup procedure, and implements normal setup of an LDP session in a dual-stack network.

The following briefly describes the method for initiating an LDP session connection according to the embodiment of the present invention by using three specific application scenarios where both the local device and the peer device are LSRs. As can be known from the following application scenarios, the LDP session setup method may be used to implement normal setup of an LDP session during interworking with multiple LSRs, and avoid the session failure problem caused by a conflict of address families. The LDP session setup may be implemented by setting up a TCP connection.

Embodiment 4

Figure 4:
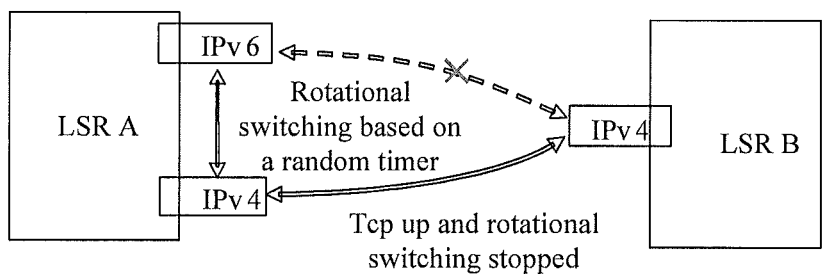
FIG. 4 is a schematic diagram of a scenario of Embodiment 4 of a method for initiating an LDP session connection according to the present invention.

FIG. 4 is a schematic diagram of a scenario of Embodiment 4 of a method for initiating an LDP session connection according to the present invention. In this embodiment, LSR B adopts a policy of using a fixed address family, for example, LSR B selects an IPV4 address family to set up a TCP connection.

As shown in FIG. 4, LSR B uses a fixed IPV4 address family, and local LSR A is a dual-stack router. In this embodiment, LSR B may be a dual-stack router, and may send IPV4 and IPV6 hello messages, and only use the fixed IPV4 address family to set up a connection.

Correspondingly, the local LSR A may also receive two types of hello messages, namely, IPV4 and IPV6 hello messages, and may select, according to the address families carried in the first received hello message, one address family to set up a TCP connection. For example, the local LSR A first receives the IPV6 hello message sent by LSR B; therefore, the local LSR A selects the IPV6 address family to set up a TCP connection, and keeps using the IPV6 address family at a time to set up a TCP connection with LSR B.

However, because LSR B adopts the policy of using a fixed IPV4 address family, the local LSR A fails to set up a connection; after the connection fails to be set up by using the IPV6 address family, the random value timer may be started; the IPV6 address family is switched to the IPV4 address family, and the IPV4 address family is used again to attempt to set up a TCP connection with LSR B. Therefore, to set up a TCP connection, the local device needs to perform rotational switching only once. Rotational switching may be stopped after the TCP connection setup is successful.

In this embodiment, if the local LSR A acts as an initiator when setting up a TCP connection, the procedure described in Embodiment 2 may be used; and if the local LSR A acts as a responder, the procedure described in Embodiment 3 may be used.

The method for initiating an LDP session connection according to the embodiment, by setting a random value timer to control automatic switching between address families, solves the deadlock problem of an LDP session setup procedure, and implements normal setup of an LDP session in a dual-stack network.

Embodiment 5

Figure 5:
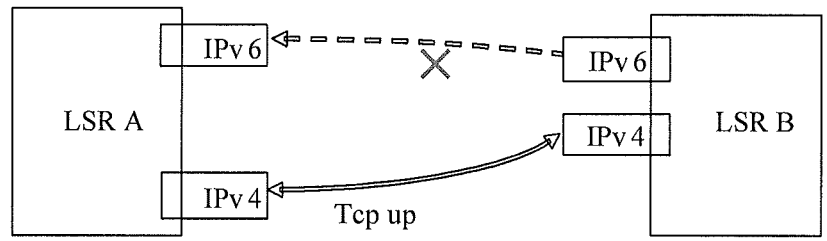
FIG. 5 is a schematic diagram of a scenario of Embodiment 5 of a method for initiating an LDP session connection according to the present invention.

FIG. 5 is a schematic diagram of a scenario of Embodiment 5 of a method for initiating an LDP session connection according to the present invention. In this embodiment, a peer LSR may adopt a policy of using two address families to set up LDP session connections simultaneously; for example, LSR B uses both IPV4 and IPV6 address families, expecting to set up two TCP connections respectively.

As shown in FIG. 5, in this embodiment, the local LSR A may also receive a hello message sent by LSR B, but LSR A may be set to process a TCP connection of only one address family at a time. For example, the local LSR A may select, according to the address family carried in the first received hello message, one address family to set up a TCP connection. For example, the local LSR A may select the IPV4 address family or the IPV6 address family.

In the scenario of this embodiment, because the peer device uses two address families to set up TCP connections simultaneously, that is, no matter whether the local LSR selects IPV4 or IPV6, the peer device may perform the corresponding TCP connection setup procedure. Therefore, a TCP connection may be set up without rotational switching; therefore, in this embodiment, the random value timer may not need to be started.

The method for initiating an LDP session connection according to the embodiment, by setting a random value timer to control automatic switching between address families, solves the deadlock problem of an LDP session setup procedure, and implements normal setup of an LDP session in a dual-stack network.

Embodiment 6

Figure 6:
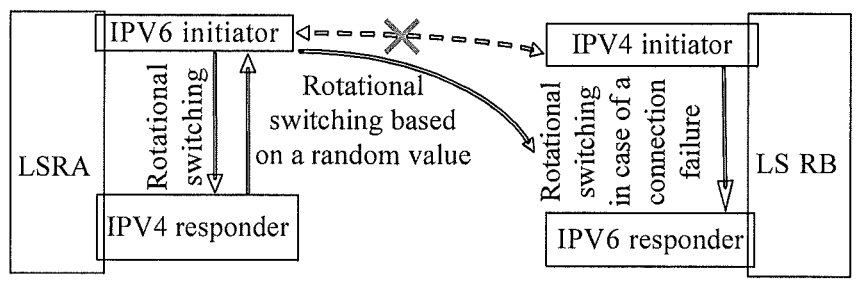
FIG. 6 is a schematic diagram of a scenario of Embodiment 6 of a method for initiating an LDP session connection according to the present invention.

FIG. 6 is a schematic diagram of a scenario of Embodiment 6 of a method for initiating an LDP session connection according to the present invention. In this embodiment, in the TCP connection setup process, LSR B may adopt a policy of switching between address families.

As shown in FIG. 6, the peer LSR B is a dual-stack router, and may also perform switching between address families when the TCP connection setup fails.

If the address family initially selected by the local LSR A is the same as the address family initially selected by the peer LSR B, for example, both select the IPV4 address family, the TCP connection setup may be successful, and neither the local device nor the peer device requires rotational switching.

If the address family initially selected by the local LSR A is different from the address family initially selected by the peer LSR B, for example, the local LSR A initially selects an IPV6 address family, while the peer LSR B initially selects an IPV4 address family, the TCP connection setup may fail. In this case, the local LSR A may start a random value timer to perform a procedure for switching between address families; the peer LSR B may also start the timer to perform switching between address families.

If the timing duration of the random value timer of the local LSR A is the same as the duration of the timer of the peer LSR B, after the local LSR A and the peer LSR B switch address families simultaneously, inconsistency of address families may still occur, resulting in a TCP connection setup failure. However, the random value timer is used in this embodiment, and the timing duration of the timer is not fixed and unchanged but variable randomly; therefore, the probability that the random values of the two timers are the same is very small, and the probability of being consecutively the same is smaller; therefore, the TCP connection setup is finally successful.

In this embodiment, if the local LSR A acts as an initiator when setting up a TCP connection, the procedure described in Embodiment 2 may be used; and if the local LSR A acts as a responder, the procedure described in Embodiment 3 may be used.

The method for initiating an LDP session connection according to the embodiment, by setting a random value timer to control automatic switching between address families, solves the deadlock problem of an LDP session setup procedure, and implements normal setup of an LDP session in a dual-stack network.

Embodiment 7

Figure 7:
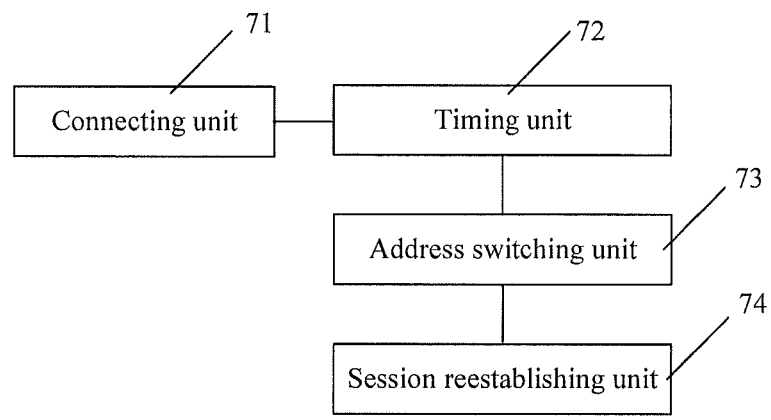
FIG. 7 is a schematic structural diagram of Embodiment 1 of a label forwarding router according to the present invention.

FIG. 7 is a schematic structural diagram of Embodiment 1 of a label forwarding router according to the present invention. The label forwarding router LSR of this embodiment may execute the method for initiating an LDP session connection according to any embodiment of the present invention. As shown in FIG. 7, the label forwarding router may include a connecting unit 71, a timing unit 72, an address switching unit 73, and a session reestablishing unit 74.

The connecting unit 71 may use an address of the label forwarding router that belongs to a first transport address family as a connection address of the router, and start an LDP session setup procedure for the label forwarding router and a peer device according to the connection address of the router.

For example, the connecting unit 71 may select, when receiving a neighbor discovery message sent by a peer label forwarding router, where the neighbor discovery message includes a target address of the peer device that belongs to the first transport address family, an address family same as the address family used by the peer device, namely, use the address of the label forwarding router that belongs to the first transport address family as a connection address of the router.

The timing unit 72 may set a random time value and perform timing in the LDP session setup procedure.

The address switching unit 73 may select an address of the label forwarding router that belongs to a second transport address family as a new connection address of the router when the timing unit 72 determines that current time reaches the random time value and a connection result of the connecting unit 71 is that the LDP session setup fails.

The session reestablishing unit 74 may instruct the connecting unit 71 to start a new LDP session setup procedure for the label forwarding router and the peer device according to the new connection address of the router.

For example, the first transport address family is an IPv4 address family, and the second transport address family is an IPv6 address family; or the first transport address family is an IPv6 address family, and the second transport address family is an IPv4 address family.

The label forwarding router of this embodiment, by setting a connecting unit, a timing unit, an address switching unit, and so on to control automatic switching between address families through a random value timer, solves the deadlock problem of an LDP session setup procedure, and implements normal setup of an LDP session in a dual-stack network.

Embodiment 8

Figure 8:
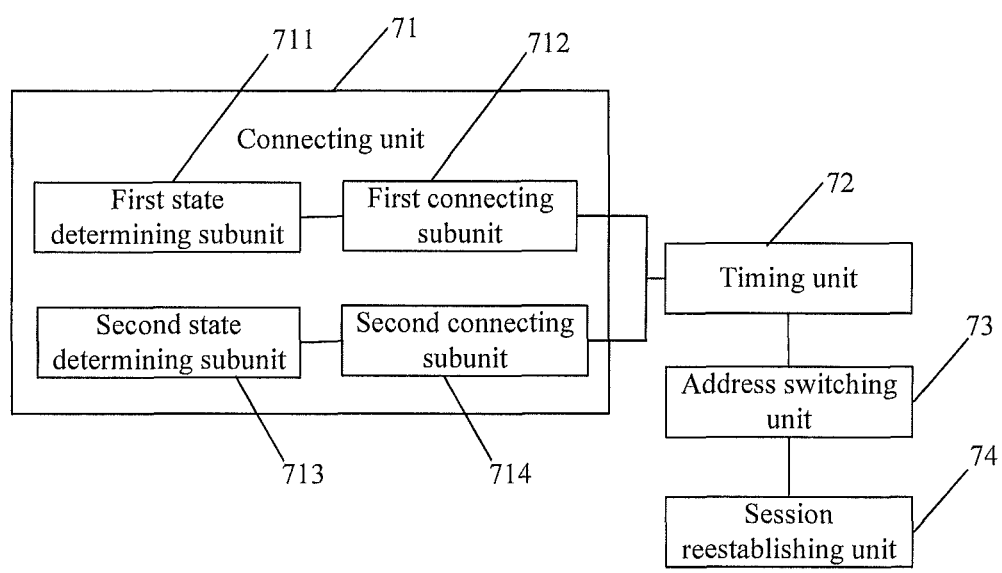
FIG. 8 is a schematic structural diagram of Embodiment 2 of a label forwarding router according to the present invention.

FIG. 8 is a schematic structural diagram of Embodiment 2 of a label forwarding router according to the present invention. The label forwarding router LSR of this embodiment may execute the method for initiating an LDP session connection according to any embodiment of the present invention.

As shown in FIG. 8, the connecting unit 71 may include a first state determining subunit 711 and a first connecting subunit 712.

The first state determining subunit 711 is configured to determine the label forwarding router as an initiator; and the first connecting subunit 712 is configured to send an LDP session setup request to the peer device when the first state determining subunit 711 determines the label forwarding router as the initiator; the timing unit 72 is configured to set a random time value and perform timing after the label forwarding router receives a connection failure response returned by the peer device.

The connecting unit 71 may also include a second state determining subunit 713 and a second connecting subunit 714.

The second state determining subunit 713 is configured to determine the label forwarding router as a responder; and the second connecting subunit 714 is configured to start receiving an LDP session setup request sent by the peer device when the second state determining subunit 713 determines the label forwarding router as the responder; and the timing unit 72 is configured to set a random time value and start timing when or after the second connecting subunit 714 starts receiving the LDP session setup request.

Preferably, the timing unit 72 may be a random value timer. The first transport address family is an IPv4 address family, and the second transport address family is an IPv6 address family; or the first transport address family is an IPv6 address family, and the second transport address family is an IPv4 address family.

Optionally, in this embodiment, the connecting unit 71 may include the first state determining subunit 711 and the first connecting subunit 712, but does not include the second state determining subunit 713 and the second connecting subunit 714.

Optionally, in this embodiment, the connecting unit 71 may include the second state determining subunit 713 and the second connecting subunit 714, but does not include the first state determining subunit 711 and the first connecting subunit 712.

Optionally, in this embodiment, the connecting unit 71 may include all the first state determining subunit 711, the first connecting subunit 712, the second state determining subunit 713, and the second connecting subunit 714.

The label forwarding router of this embodiment, by setting a connecting unit, a timing unit, an address switching unit, and so on to control automatic switching between address families through a random value timer, solves the deadlock problem of an LDP session setup procedure, and implements normal setup of an LDP session in a dual-stack network.

Persons of ordinary skill in the art may understand that, all or a part of the steps of the foregoing method embodiments may be implemented by a program instructing relevant hardware. The foregoing programs may be stored in a computer readable storage medium. When the program runs, the foregoing steps included in the method embodiments are performed. The foregoing storage medium includes various mediums capable of storing program codes, such as a ROM, a RAM, a magnetic disk or an optical disk.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments, or make equivalent replacements to some technical features thereof, without departing from the spirit and scope of the technical solutions of the embodiments of the present invention.

What is claimed is:

1. A method for initiating a Label Distribution Protocol (LDP) session connection, comprising:

using, by a local device, an address of the local device that belongs to a first transport address family as a connection address of the local device, and starting an LDP session setup procedure for the local device and a peer device according to the connection address of the local device;

setting, by the local device, a random time value by starting a random value timer and performing timing in the LDP session setup procedure;

determining, by the local device, that current time reaches the random time value and that the LDP session setup fails; and selecting, by the local device, an address of the local device that belongs to a second transport address family as a new connection address of the local device, and starting a new LDP session setup procedure for the local device and the peer device according to the new connection address of the local device.

2. The method for initiating a LDP session connection according to claim 1, wherein before the using an address of a local device that belongs to a first transport address family as a connection address of the local device, the method further comprises:

receiving a neighbor discovery message sent by the peer device, wherein the neighbor discovery message comprises a target address of the peer device that belongs to the first transport address family.

3. The method for initiating a LDP session connection according to claim 1, wherein:

the first transport address family is an IPv4 address family, and the second transport address family is an IPv6 address family; or the first transport address family is an IPv6 address family, and the second transport address family is an IPv4 address family.

4. A method for initiating a Label Distribution Protocol (LDP) session connection comprising:

using an address of a local device that belongs to a first transport address family as a connection address of the local device, and starting an LDP session setup procedure for the local device and a peer device according to the connection address of the local device;

setting a random time value and performing timing in the LDP session setup procedure;

determining that current time reaches the random time value and that the LDP session setup fails; and selecting an address of the local device that belongs to a second transport address family as a new connection address of the local device, and starting a new LDP session setup procedure for the local device and the peer device according to the new connection address of the local device, wherein:

the starting an LDP session setup procedure for the local device and the peer device according to the connection address of the local device comprises:

determining, by the local device, the local device as an initiator; and sending, by the local device, an LDP session setup request to the peer device; and the setting a random time value in the LDP session setup procedure comprises:

setting a random time value after the local device receives a connection failure response returned by the peer device.

5. A method for initiating a Label Distribution Protocol (LDP) session connection comprising:

using an address of a local device that belongs to a first transport address family as a connection address of the local device, and starting an LDP session setup procedure for the local device and a peer device according to the connection address of the local device;

setting a random time value and performing timing in the LDP session setup procedure;

determining that current time reaches the random time value and that the LDP session setup fails; and selecting an address of the local device that belongs to a second transport address family as a new connection address of the local device, and starting a new LDP session setup procedure for the local device and the peer device according to the new connection address of the local device, wherein:

the starting an LDP session setup procedure for the local device and the peer device according to the connection address of the local device comprises:

determining, by the local device, the local device as a responder; and starting, by the local device, receiving an LDP session setup request sent by the peer device; and the setting a random time value in the LDP session setup procedure comprises:

setting a random time value when or after the local device starts receiving the LDP session setup request sent by the peer device.

6. A label forwarding router, comprising:

a connecting unit, configured to use an address of the label forwarding router that belongs to a first transport address family as a connection address of the router, and start an LDP session setup procedure for the label forwarding router and a peer device according to the connection address of the router;
a timing unit, configured to set a random time value and perform timing in the LDP session setup procedure;
an address switching unit, configured to select an address of the label forwarding router that belongs to a second transport address family as a new connection address of the router when the timing unit determines that current time reaches the random time value and a connection result of the connecting unit is that the LDP session setup fails; and
a session reestablishing unit, configured to instruct the connecting unit to start a new LDP session setup procedure for the label forwarding router and the peer device according to the new connection address of the router.

7. The label forwarding router according to claim 6, wherein the timing unit is a random value timer.

8. The label forwarding router according to claim 6, wherein:
the connecting unit is further configured to: before the using the address of the label forwarding router that belongs to the first transport address family as the connection address of the router, receive a neighbor discovery message sent by the peer device, wherein the neighbor discovery message comprises a target address of the peer device that belongs to the first transport address family.

9. The label forwarding router according to claim 6, wherein:
the first transport address family is an IPv4 address family, and the second transport address family is an IPv6 address family; or
the first transport address family is an IPv6 address family, and the second transport address family is an IPv4 address family.

10. A label forwarding router comprising:
a connecting unit, configured to use an address of the label forwarding router that belongs to a first transport address family as a connection address of the router, and start an LDP session setup procedure for the label forwarding router and a peer device according to the connection address of the router;
a timing unit, configured to set a random time value and perform timing in the LDP session setup procedure,
an address switching unit, configured to select an address of the label forwarding router that belongs to a second transport address family as a new connection address of the router when the timing unit determines that current time reaches the random time value and a connection result of the connecting unit is that the LDP session setup fails; and
a session reestablishing unit, configured to instruct the connecting unit to start a new LDP session setup procedure for the label forwarding router and the peer device according to the new connection address of the router, wherein:
the connecting unit comprises:
a first state determining subunit, configured to determine the label forwarding router as an initiator; and
a first connecting subunit, configured to send an LDP session setup request to the peer device when the first state determining subunit determines the label forwarding router as the initiator; and
the timing unit is configured to set a random time value and perform timing after the label forwarding router receives a connection failure response returned by the peer device.

11. A label forwarding router comprising:
a connecting unit, configured to use an address of the label forwarding router that belongs to a first transport address family as a connection address of the router, and start an LDP session setup procedure for the label forwarding router and a peer device according to the connection address of the router;
a timing unit, configured to set a random time value and perform timing in the LDP session setup procedure;
an address switching unit, configured to select an address of the label forwarding router that belongs to a second transport address family as a new connection address of the router when the timing unit determines that current time reaches the random time value and a connection result of the connecting unit is that the LDP session setup fails; and
a session reestablishing unit, configured to instruct the connecting unit to start a new LDP session setup procedure for the label forwarding router and the peer device according to the new connection address of the router, wherein:
the connecting unit comprises:
a second state determining subunit, configured to determine the label forwarding router as a responder; and
a second connecting subunit, configured to start receiving an LDP session setup request sent by the peer device when the second state determining subunit determines the label forwarding router as the responder; and
the timing unit is configured to set a random time value and start timing when or after the second connecting subunit starts receiving the LDP session setup request.

* * * * *